United States Patent [19]

Gore et al.

[11] Patent Number: 5,767,584
[45] Date of Patent: Jun. 16, 1998

[54] METHOD FOR GENERATING ELECTRICAL POWER FROM FUEL CELL POWERED CARS PARKED IN A CONVENTIONAL PARKING LOT

[75] Inventors: Gerald E. Gore, North Branch; Harry T. Roman, East Orange; Wayne K. Wittman, Cranbury; Robert A. Gore; Michael D. Gore, both of North Branch, all of N.J.

[73] Assignee: GRoW International Corp., North Branch, N.J.

[21] Appl. No.: 557,339

[22] Filed: Nov. 14, 1995

[51] Int. Cl.⁶ .................................................. H02P 9/04
[52] U.S. Cl. ........................... 290/1 R; 290/4 R; 290/4 A
[58] Field of Search .............................. 290/1 R, 4 R, 290/4 A

[56] References Cited

U.S. PATENT DOCUMENTS

| | | | |
|---|---|---|---|
| 3,894,242 | 7/1975 | Helling | 307/10.1 |
| 4,182,960 | 1/1980 | Reuyl | 290/1 R |
| 4,507,720 | 3/1985 | Colbrese | 363/13 |
| 4,751,151 | 6/1988 | Healy et al. | 429/17 |
| 4,935,689 | 6/1990 | Fujikawa et al. | 322/1 |
| 5,318,142 | 6/1994 | Bates et al. | 180/65.2 |
| 5,434,015 | 7/1995 | Yamada et al. | 429/9 |

FOREIGN PATENT DOCUMENTS

2233319  1/1991  United Kingdom.

*Primary Examiner*—Steven L. Stephan
*Assistant Examiner*—Nicholas Ponomarenko
*Attorney, Agent, or Firm*—Ezra Sutton

[57] ABSTRACT

The present invention provides a method and apparatus for generating electrical power from multiple vehicles powered by fuel cells while the vehicles are parked in a parking lot. A plurality of spaced-apart electrical receptacles are provided for receiving an electric cable for connection to a parked vehicle for electrically connecting the fuel cell in each of the parked vehicles to the plurality of electrical receptacles. An electric power grid is electrically connected to the plurality of electrical receptacles for transferring D.C. electrical power from the fuel cells in the parked vehicles to the electric power grid. At least one electric power collection station is electrically connected to the electric power grid for collecting at a common point the D.C. electric power in the electric power grid. In addition, at least one inverter is electrically connected to the electric power collection station for converting the D.C. electric power to A.C. electric power. Apparatus is provided for supplying the A.C. electric power to a load or a utility grid.

21 Claims, 6 Drawing Sheets

METHOD FOR GENERATING ELECTRICAL POWER FROM FUEL CELL POWERED CARS PARKED IN A CONVENTIONAL PARKING LOT

FIELD OF THE INVENTION

This invention relates to the unique use of fuel cell powered cars while they are sitting parked in a conventional parking lot. Each of these cars contains (or will contain) a 40 kilowatt (kW) size power plant that can be energized to produce electricity while the car is sitting idle in the parking lot. This "at idle" generation of electrical power can be harnessed to economically provide useful electrical service to surrounding buildings.

BACKGROUND OF THE INVENTION

Many automotive manufacturers are working on prototype cars which will contain fuel cell power plants as their prime motive power. The electrical energy generated by these fuel cells will energize an electric motor or motors thus propelling the car. Natural gas, hydrogen, or other light gaseous, hydrocarbon bearing fuels can be used to provide a fuel input to the fuel cells. Propane, digester or biogas as well as gasoline or other fuels that can be processed through a cracking process to produce hydrogen are candidate fuels for the fuel cell.

This invention utilizes the novel process focused on the process that fuel cell powered cars can not only generate electrical energy for motion, but when at rest or parked in a parking lot, the fuel cells can be energized and its energy harnessed and focused through an electric power grid so as to provide a unique electrical power for local use. Traditional combustion engine power plants in cars can also be used to provide extremely limited or nominal amounts of alternating current (AC) electrical power through an inverter. Still relatively small amounts of direct current (DC) electrical power are produced by these cars, typically utilized to sustain the electrical needs of the car and its accessories. However, it is difficult to obtain useful electrical power from these engines: their low conversion efficiency, their need for cooling by their generated air flow during locomotion, and pollution emissions make them not a candidate for meaningful power generation. They are designed to be a device for the purpose of locomotion. Hybrid vehicles or turbine powered vehicles are a technology stretch at this point. However, this invention could spur the further commercialization of and near term modification of the hybrid vehicle. Hybrid vehicle for the purpose of this invention is defined as a vehicle that utilizes electric motors to drive the wheels and is powered by a combination of an internal combustion engine in concert with a generator. This vehicle could be modified in accordance with our invention but has many of the limitations described herein for the internal combustion engine. Fuel cells on the other hand have high conversion efficiencies, relatively low emissions, and can be run continuously without the mechanical problems normally encountered with running combustion engines for long periods of time. Fuel cell powered vehicles have an unrecognized and untapped potential. This invention uniquely utilizes a novel methodology and process to provide significant amounts of energy at the local distribution level.

The 40 kW fuel cell as used in this invention is typical of the size fuel cell utilized in certain fuel cell powered vehicles, although other sizes can be utilized. The fuel cell as used in this application can also be modular in design and of various sizes. The ultimate size of the fuel cell or cells utilized in a vehicle is a current function of its locomotion application, this can be modified in the future with the process identified in our invention. The locomotion function of the vehicle may become secondary to its power generation function. As a means of example, a small urban parking lot containing 100 parked fuel cell powered cars each with a 40 kW power plant can generate 4,000 kW of power, or 4 megawatts (MW). This amount of power is typically equivalent to the delivery capability of two standard 4,160 volt electric utility feeder circuits, or half of a 13,200 volt circuit. These voltage level circuits are rather common in electric utility industry practice. Each of these types of circuits can normally handle hundreds of houses and/or commercial or light industrial loads. A small parking lot can become a significant source of localized electric power generation-or in the common parlance of the utility industry . . . dispersed generation. In a downtown area, such power generation can easily supply large office building loads. A five level parking deck with 100 cars per deck can provide 20 MW of power, which is the size of an entire utility substation designed to feed thousands of homes or a mixture of residential/commercial/industrial load in a region measured in square miles of size.

Expanded to the state level, consider that a state like New Jersey has close to 2 million registered drivers. Each of their fuel cell powered cars could produce 40 kW of power for a combined output of 80,000 MW. This is over 4 times the power that New Jersey residents demand on the peak days of the year; and over 1½ times the demand of the entire Pennsylvania-New Jersey-Maryland power pool which supplies that region with electricity.

This invention uniquely capitalizes on the fuel cell powered car as a modular, mobile energy source that can be used while parked for long periods of time in parking lots while their drivers are at work, leisure, shopping, or conducting business. A unique feature of this invention is to transform the car or other vehicle from a single use device (ie transportation) to a dual use device; one that still provides transportation but also and importantly provides electrical power.

This invention uniquely provides for the distributed generation to be transported directly to the point of the distribution load or need for power. Distributed generation that goes from the morning load in the home or apartment; to the work load- the office building, parking lot or factory; and then at the end of the day uniquely travels to the next load, the home or apartment. This invention transforms the aspect of distributed generation from "not in my back yard" as is commonly the cry, to yes in my backyard, yes and also in my garage and yes also in my driveway and yes also at my work. Quite a remarkable reversal.

This invention also radically alters the common perception of the parking lot as a passive "blight" on the urban landscape. It has come in common literature and urban redevelopment projects to typify the waste of valuable urban land. Now, with the ability of the parking lot to become a valuable contributor to the energy economy of the urban area, the land value of the parking lot will increase dramatically. It will come to typify an ingenious way to combine the need to park one's vehicle with the consequent generation of clean, and economic energy. It also changes the way cars will be valued, priced, and ultimately marketed as multiple use machines and rolling power sources. The power output of parking lots will dramatically change the way that electric utilities plan and construct generating facilities. They and other independent power producers will have to plan to include the dispersed parking lot generation power sources into their overall energy mix. The cheaper cost of fuel cell power plant derived energy will affect the ultimate cost of electrical energy to all classes of customers. This invention will significantly change the way electricity is generated in the United States ... and the world. This invention combines novel processes to be applied in an invention that provides positive change for both the utility and automotive industries.

SUMMARY OF THE INVENTION

The invention uses a unique and novel process to connect fuel cell powered cars to generate bulk amounts of electrical power. A tandem connection is one method of connecting these vehicles. The unique viewpoint of a conventional parking lot as a dispersed generation site is the key strategic aspect of this invention. There are other significant aspects of this invention pointing to the use of fuel cell powered cars to provide electrical power to large commercial/industrial buildings by using their employee parking lots as generation sites. Schools, shopping centers, municipal parking lots, airport parking lots, stadiums, movie theaters, hotels, restaurants, and hospitals can all become significant dispersed generation sites. This also makes it possible to use home garages and driveway parked cars as power sources for the residence. Wherever there is a parking lot, fuel cell powered cars can be used to generate significant amounts of electric power.

Parking lot for the purpose of this invention is defined as where one or more vehicles are parked, the single vehicle is recognized by this invention as a novel and practical source of power. Although a car is mentioned in this invention, this invention clearly is applicable to other vehicles and for the purpose of this invention, car is defined as any vehicle that derives its energy from a fuel cell including a motorcycle or a scooter. The fuel cell is the preferred source of power, however the process of our invention could be incorporated into internal combustion engine powered vehicles where emissions and cooling and other limitations discussed herein were taken into account in their redesign. Although not considered economical, the process of this invention could also apply to a battery powered electric vehicle. A more near term alternative to the fuel cell, although not the preferred embodiment of our invention, is the hybrid vehicle. A vehicle that produces a significant amount of energy, relatively easily converted to electrical energy, that can be directed to an off board load is one of the aspects of our invention.

PREFERRED EMBODIMENT OF THE INVENTION

The preferred embodiment of the invention must be addressed as a fuel cell powered vehicle. The preferred fuel cell type would be a proton exchange membrane fuel cell.

Figure 1:
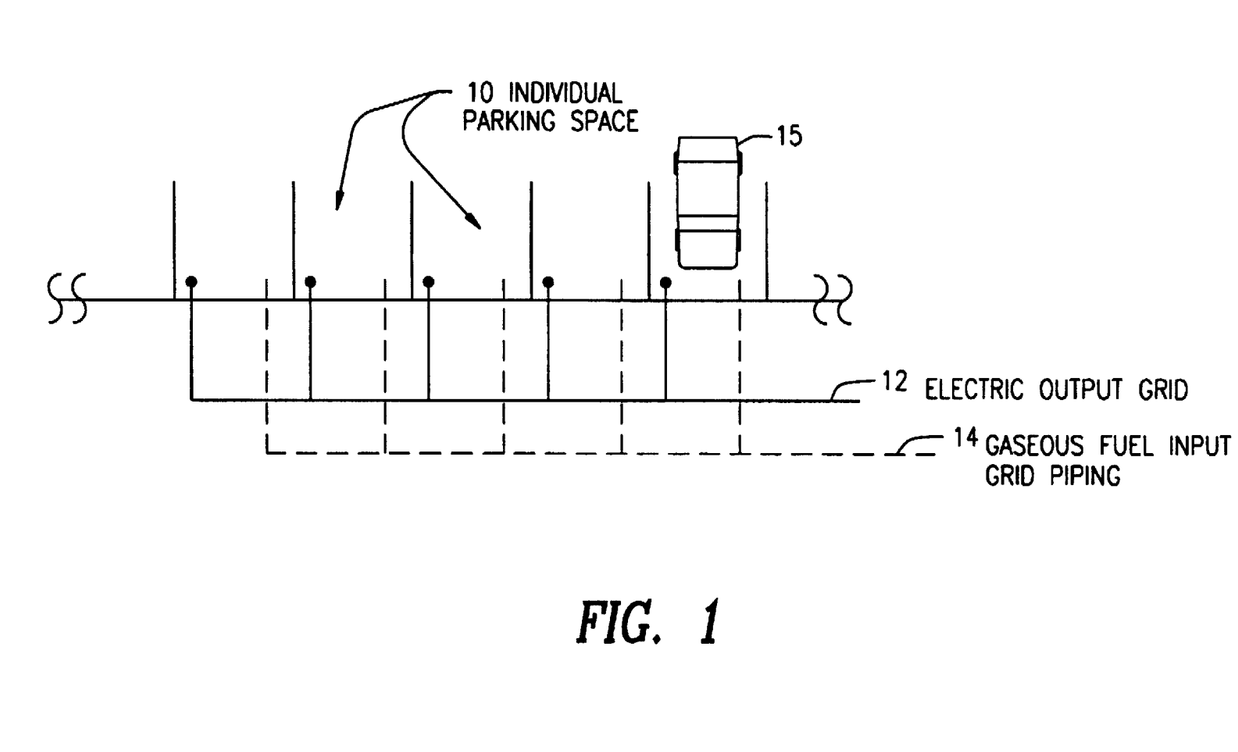

FIG. 1 shows a typical layout for a ground level parking lot, with cars laid out around the perimeter of the lot as well as clustered in the middle of the lot. This is fairly standard practice in most parking lots.

Figure 2:
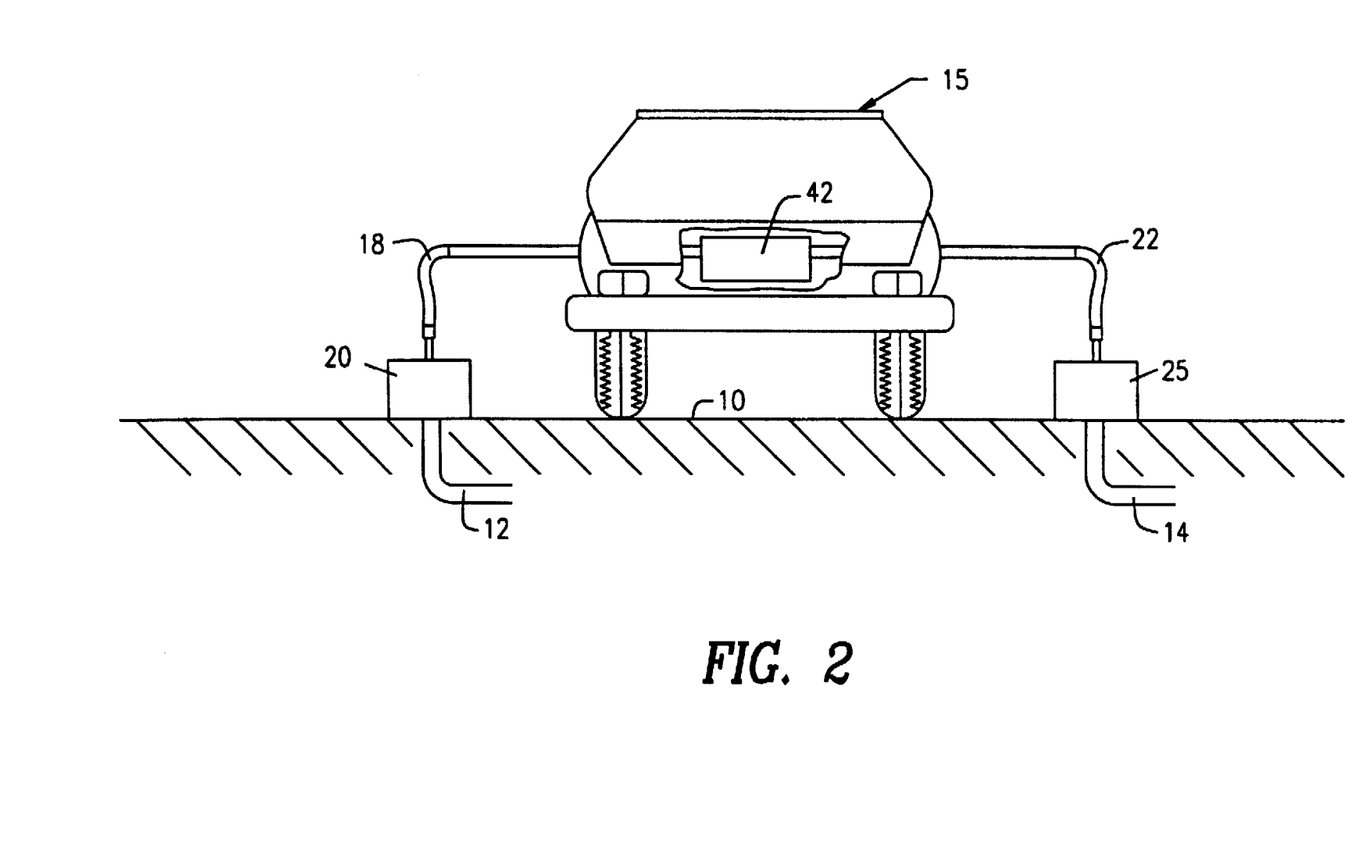

FIG. 2 shows how each parking space (10) would be supplied with a gaseous fuel input (14) from a fuel grid, and an electric output connection (12). In this case, the gaseous fuel is assumed to be natural gas from locally available utility sources. It could also be hydrogen or another form of light hydrocarbon bearing fuel. The fuel cell powered car (15) would be parked in the space (10) as shown in the exploded view of FIG. 2. A snap in gas hose (22) pulled out of the car's chassis would connect to a docking port (25) for the natural gas available from the gas fuel input grid (14). An electric snap in cable (18) pulled out of the car's chassis would connect to a docking port (20) for the electric power grid (12) to collect the generated electricity.

Each car in the parking lot would be connected in this fashion when it is parked. Natural gas flows into the cars and is converted to electricity which is then collected thru the electric output grid.

Figure 3:
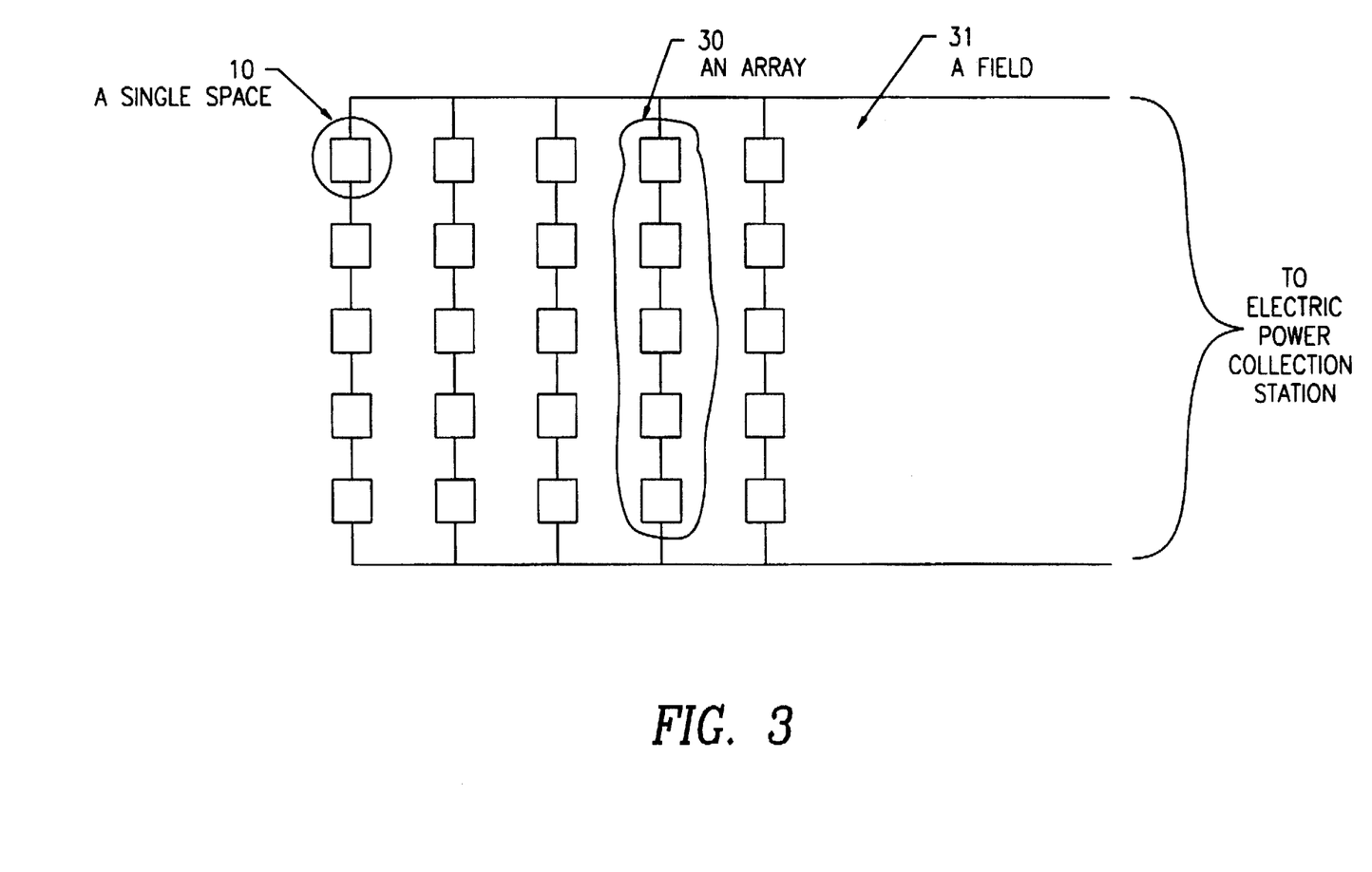
Figure 4:
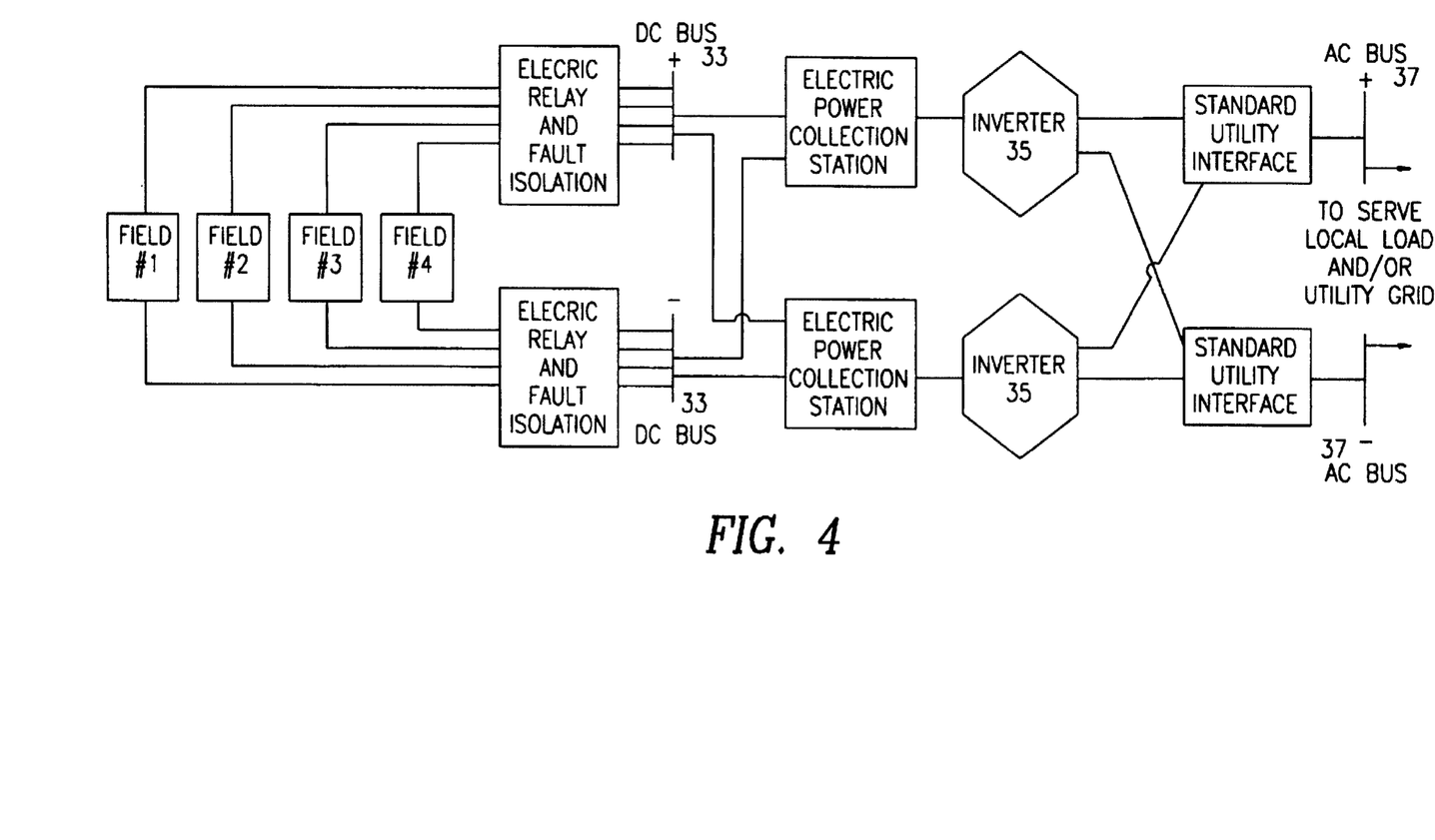

FIGS. 3 and 4 illustrates how the energy collected from the parking spaces is put to work supplying electrical loads in local buildings or directly in the utility grid.

FIG. 3 shows how each parking space (10) is arranged electrically, first into an array (30), and then into a field of parking spaces (31). This electrical arrangement is very similar to the way batteries and photovoltaic conversion devices are arranged in series/parallel arrangement to produce a desired voltage and current delivery capability. The number of parking spaces serially arranged in an array (30) and in parallel in a field (31) is an on-site engineering design choice dictated by local conditions and the amount and type of load to be served. For illustrative purposes, FIG. 3 shows a representative design example for a 100 car parking lot, with 25 cars per field and as shown in FIG. 4, there are four fields.

FIG. 4 shows how the four fields (31) are connected to common direct current buses (33) for input into the DC to AC conversion device known as an inverter. Once put through the inverter (35), the AC output of the inverter becomes the input to the AC bus (37) which will supply local loads or interface directly to the utility grid. Not shown in detail here, but essential is the electrical relaying, fault isolation protection, voltage regulation equipment, and metering which is customary for electrical power systems of this type. These electrical systems, their technology and their hardware, are well understood and readily available to the utility industry.

The electrical design of any one parking lot as mentioned before is a local engineering design depending upon the number of cars to be utilized, the total amount of energy to be carried by the fields, the types of loads to be served, and the physical size and layout of the parking lot itself.

The wide range of sizes of electrical equipment and their ready availability should make the electrical interface a rather mundane design aspect of the parking lot. Much experience with battery and photovoltaic conversion devices exists to assist the designer in the correct choice of electrical cable design, inverter sizing, and suitable protective/relaying equipment. Because the parking lot energy collection system is a DC design, care must be given to the use of a cathodic protection system ... which is also a mature and well understood engineering design choice with plenty of commercially available hardware to choose from.

The power system and interface technologies, engineering know-how, and hardware already exists in the marketplace to make the fuel cell powered parking lot a near term success.

Figure 5:
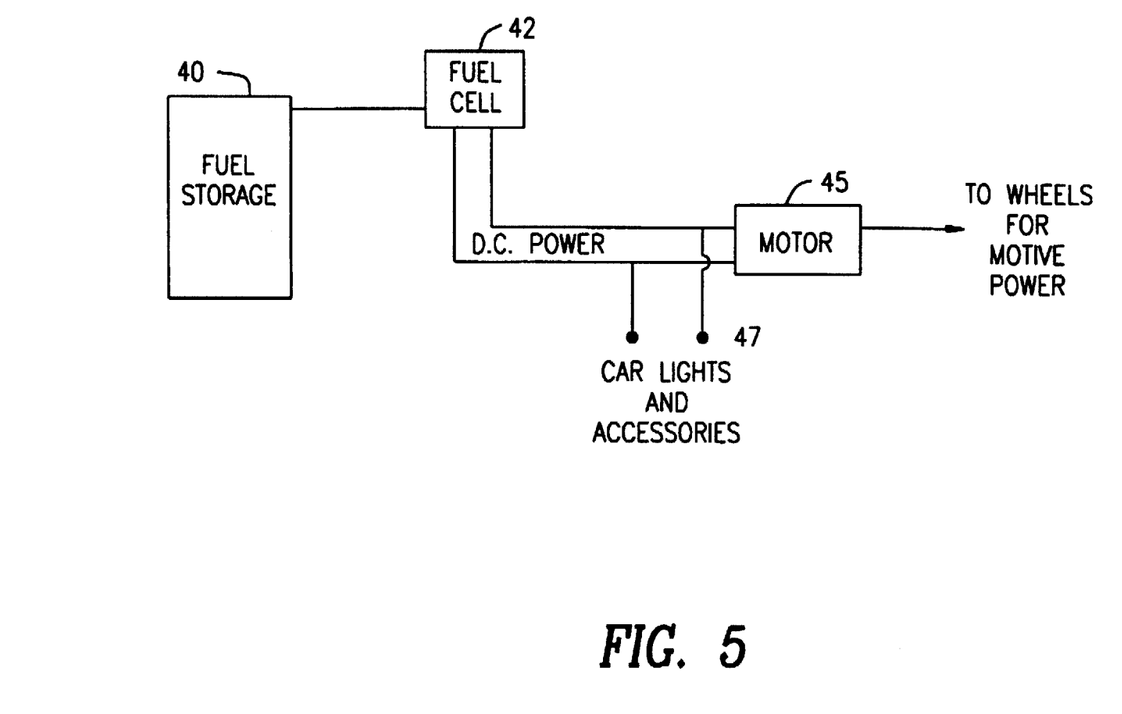
Figure 6:
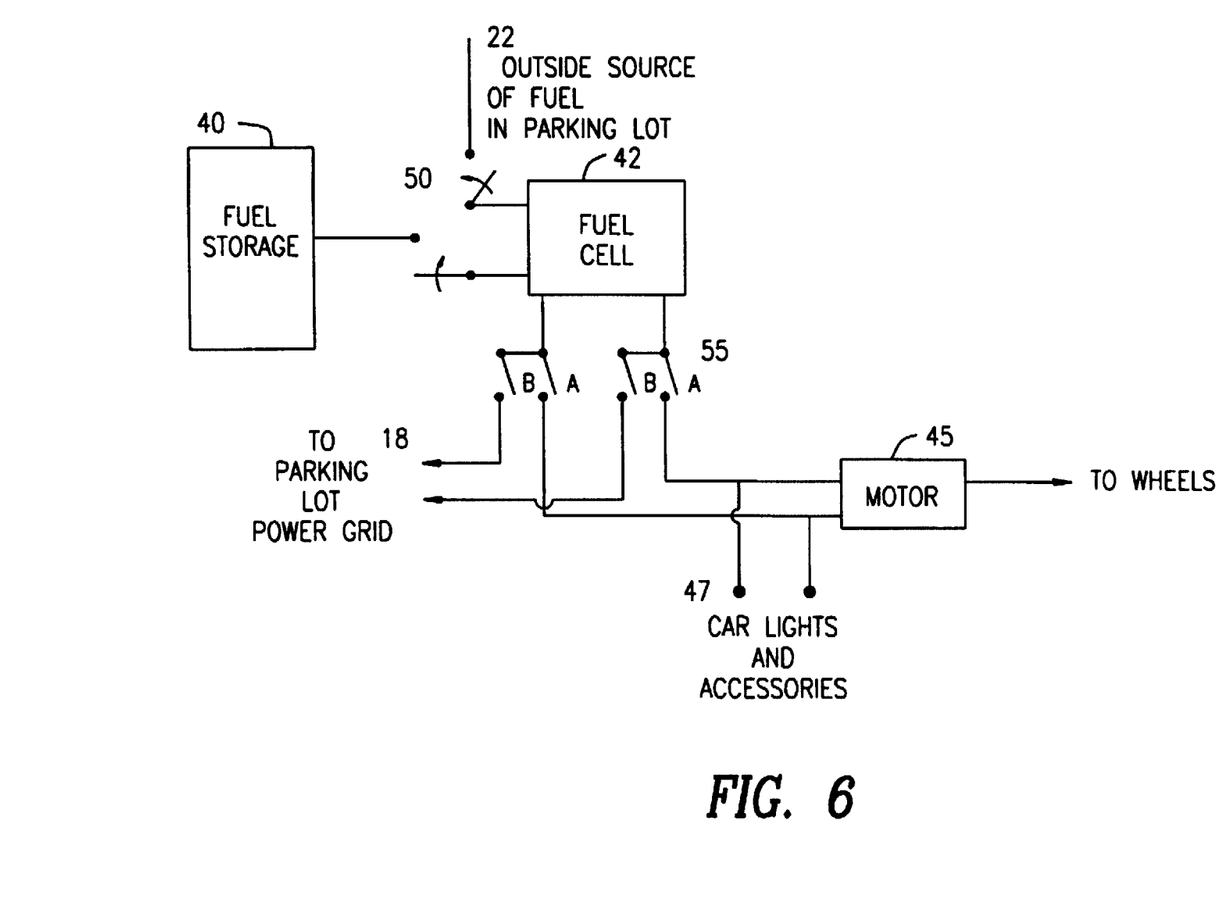

FIG. 5 diagrams the typical fuel cell powered car starting with a fuel input (natural gas) from a fuel storage tank (40) into the fuel cell (42) where it is converted to DC power for the drive motor (45) and the lights and accessories (47) of the vehicle. FIG. 6 shows how the fuel delivery system and electric output of the fuel cell would be diverted while the car is parked to generate power while stationary. A sequence of selectors (50) would be engaged to bypass the normal on board supply of natural gas fuel to the fuel cell in favor of the natural gas provided at the parking space (14). An analogous sequence of selectors (55) would also provide for the bypass of the normal electrical output of the fuel cell in favor of the redirection of that output into the parking lot power grid (12).

In FIG. 6, the car is generating power while parked with its normal fuel and electrical power output pathways intercepted for stationary power generation. For use as a driven vehicle again, the normal pathways for fuel and electric power output would be restored by unplugging the parking lot fuel line (22) and electric power cable (18), and resetting the respective selector switches back to their normal settings.

The structure of the parking facilities for fuel cell powered cars shown in FIGS. 1 thru 3 and described above can be duplicated in any parking lot adjacent to or near a building or utility grid supply point. The parking lot can be underground as part of the lower level of a building or in a separate underground parking lot. The parking lot can be easily incorporated into a building as part of its building and electrical design.

This invention also uniquely allows a building owner now to have the ability to place his building in areas and locations that may have been limited before by access to electrical power, or the cost of access. This invention incorporates the process that allows for this design feature. Additionally, this invention captures the pure water that will be a "waste product" of the fuel cell and in such size and amounts as to be commercially viable. The water also gives the owner access to water, potable water and helps to continue to provide the building owner with ease of locating the building and may reduce many objections to larger buildings as they become more self sufficient.

An additional feature is the low grade heat that is produced which can be utilized in hot water, for housekeeping services, heating and make up water.

An additional waste product is carbon dioxide, carbon dioxide from a fuel cell car is not considered as neither a significant problem nor in the amount produced to be a significant problem. However with our invention, now the power park owner has the option of collecting this pure carbon dioxide and providing it to manufacturers as a value added product. The number of vehicles and relative ease of collecting the gas while the vehicles are operating in an at rest mode makes the power park a carbon dioxide production plant.

The inverters (35) shown in FIG. 3 can be conveniently sized to match the power output of the parking lot to the voltage levels of the buildings or utility grid. Inverters in a variety of size ranges are commonly available for this purpose; as are the regularly specified interface hardware needed to match the flow of power from a dispersed generation site to the utility grid. This hardware and the specifications necessary for the safe interfacing of power systems is common knowledge in the industry.

SIGNIFICANCE OF THIS INVENTION

Consider a single fuel cell powered car or other vehicle, parked in a parking lot where its 40 kW on-board fuel cell is working 8 hours per day generating electricity which is in turn then supplying the normal electrical load of an adjacent building-such as an office building.

The energy output of the fuel cell is 40 kW×8 hours=320 kWh.

If this energy was sold directly to a local electric utility, the car owner would be paid what is termed the marginal generating rate, which for a typical New Jersey utility would be approximately $0.025/kWh. This marginal rate does vary around the United States because of local utility fuel costs, generation mix, and the types of load served by a utility. The $0.025 rate used here is a typical representation and not so different for a major portion of the industrialized areas of the nation. Therefore, if the 320 kWh was sold at the marginal rate, the realized revenue would be $8.00; assuming of course that there was a convenient way to convert the DC electrical output of the fuel cell into the AC electrical standard of the utility grid.

Now, using the invention described in this patent where the output of the fuel cell is sold to the parking lot owner who installs all the necessary interface equipment to allow the energy generated to be sold to a local and ready customer like an office building, the economics of the transaction described above becomes quite different and beneficial to all parties concerned. The owner of the fuel cell powered car may want to sell his 320 kWh to the parking lot owner for greater than what the local utility would give him for the same energy. He might want $0.035/kWh, instead of the $0.025 that the utility would give him. If the parking lot owner agrees to buy for that rate, the car owner would receive approximately $11 for the daily output of his car. The parking lot owner would then be free to retail the 320 kWh of electrical energy to the building owner. Since the parking lot owner purchased the energy for $0.035/kWh, he might be motivated to sell it at perhaps $0.085/kWh to cover all the costs invested in the parking lot electrical interface wiring and natural gas fuel grid, and daily operating costs.

Looking at the building owner, he realizes a savings on the normal cost of his electricity by buying it cheaper than from the local utility, whose typical rates would likely be in the range of $0.100/kWh or greater. He is saving $0.015/kWh, which translates to a savings of 320 kWh×$0.015/kWh savings=$4.80 per car/day.

The parking lot owner as a supplement to its current in and out parking time cost calculation will now make a credit to the vehicle owner for the power generated. This is a simple calculation of the size of generation facility of the vehicle×the length of time generating×the agreed cost to be paid. Additionally, the parking lot owner has the added ability to provide fuel to the vehicle or the vehicle owner could elect to utilize the onboard fuel supply of the vehicle. An existing parking lot owner as an example could retrofit with or without a fuel supply grid, or connectors for supplying fuel to the vehicle. The same naturally holds true for new construction. The vehicle could also contain its own inverter and thereby provide the parking lot owner directly with AC power without the parking lot owner having to install their own inverter equipment. This vehicle owner could as an example be paid a slightly higher value for its vehicle power. The parking lot owner could also choose to collect the pure water that would be produced by the fuel cells as a by product and transform this into a new value added feature, water service. This water collection grid is also an optional grid that the parking lot owner can choose to install. Although it is known that fuel cells vehicles will produce water as a by product while in locomotion, the water produced from these vehicle is being eliminated from the vehicle whilst in travel, thus this invention uniquely allows for a novel reason for the continued energizing of the fuel cell even while the vehicle is at rest and uniquely captures an amount of water that can be meaningful to a home owner and other building or parking lot owner. As an example of value, a six (6) gallon container of drinking water from Leisure Times Spring Water costs $7.50. The purity of the water from the fuel cell exceeds that of most distilled water and the value of the distilled water is higher than that of the drinking water mentioned above.

For a 100 car parking lot adjacent to an office building, the parking lot owner would realize:

320 kWh/car×100 cars×($0.085/kWh−$0.035/kWh)= $1600 in net sales per day to the parking lot owner.

The building owner would realize savings of:

320 kWh/car×100 cars×$0.015/kWh savings=$480 per day.

On a yearly basis of 235 working days per year, the following dollar amounts would accrue from a 100 car parking lot:

Each car owner . . . 235 DAYS×$11=$2585

The parking lot owner . . . 235 DAYS×$1600=$376,000 (net sales of electricity)

The building(s) owner(s) . . . 235 DAYS×$480=$112,800 (savings in electricity costs)

This realistic example illustrates just how commercially feasible the invention described herein can be. Of course, the actual costs of the electricity bought and sold between car owner, parking lot owner, and building owner would need to be worked out for the specific conditions and utility rates in an area, but the concept remains the same. The traditional parking lot can now become a generating station and buy and sell electricity to everyone's advantage. Each car now becomes a profit center for its owner while it sits in the parking lot, helping to offset its own costs, as well as amortize the expenses associated with running the fuel cell. Car owners could shop around for the best deal they could get from local parking lot owners and try to maximize their annual revenue. Building owners may want to consider installing parking facilities that could help them offset the costs of the electricity.

This process can be extended to other types of parking lots. It could be easily used at large factories or commercial establishments so that employee cars parked in the lot can provide the electricity to run the facility. Virtually anywhere a fuel cell powered car is parked, with this invention, it can become a generating station which provides electrical energy to local loads. Cars parked in the garages of a home could significantly offset the use and cost of electricity in the home. This invention has enormous commercial application. This invention embodies and as a process also permits the brokering of energy and emission credits associated with the power generated by our process and invention. With the advent of air pollution credits being brokered between independent power producers, manufacturers and traditional electric utilities, we point out an economic advantage for this invention over the current state of the art in electric generation. Those benefitting from this invention such as factory owners, parking lot owners, home owners could also sell the high efficiency pollution credits from their fuel cell powered vehicles to electric utilities or commodity banks. These credits could be sold or traded to utilities or other firms to negate their use of older, less efficient conventional power plants. This additional feature and benefit of the invention further enhances the economics of this invention.

As certain vehicles are now equipped with a feature commonly referred to as a power take off (pto), this invention incorporates the vehicle electrical interface as an improvement to the pto, that the invention is a true electric power take off and energizer or "eptoe". This eptoe feature allows the vehicle to operate as a replacement for the current state of the art mobile generator. The vehicle is a mobile generator. The improvements of this type of mobile genera-tion over that of the current gasoline, diesel or electric generation are clearly obvious. The current and popular generator of the 8 to 10 horsepower engine variety an not sufficient to power the normal home. The ability of such an electric generation source to be concealed in comparison to the current state of the art diesel or gasoline generator are enormous. Much less noise, much less thermal print much less emissions and the total elimination of need for a separate trailored mobile generator, its transport truck, its fuel for the vehicle and its fuel for consumption, its operating support staff and its necessary supporting logistics. This feature of this invention is a huge improvement over the current state of the art.

Although the Power Park, as an important improvement to the parking lot, is a significant application of the invention, the invention is even more basic and fundamental in the way it provides electric power. Typical electrical utility systems consist of fixed in place assets like generating stations, power transmission and distribution lines, and substations to provide electricity to a customer load. Power plants are designed to respond to the changing load patterns and supply electricity through a robust interconnection of wires known as the utility grid. This generation equipment is sized and made so large as to meet the highest base and peak loads and is therefore underutilized, overly costly, stationary and not flexible as distributed generation. But even with state of the art of distributed generation, it is still fixed in a location and only slightly more flexibility than standard generation. Our invention follows the changing dynamic usage pattern of the customer. Whether the customer is at home with Power Park serving the electrical needs, at his office with his Power Park serving the electrical demands of the plant or office, or returning home with the Power Park serving the electrical needs of the home and family, Power Park is mobile and services the electrical demand. Once home the electrical consumption of the home increases, the office consumption has decreased and his mobile power has responded by changing locations. To physically move generation from electrical usage load to electrical usage load and have that load served by a true responsive and interactive dispersed generation is fundamentally a part of this invention and is a new, unique way to provide electrical power. Our invention recognizes that the fundamental reason why electrical demand occurs at all is because of the presence of humans or human controlled processes. One of the things that most often accompanies the human is the car. Thus, with the fuel cell powered car, with our invention, the power plant and the Power Park is always there with the human, ready to serve the load created by the humans. A vehicle, a Power Park by its nature is modular and vehicles can be combined (electrically speaking) with other vehicles to serve a load and in essence be disassembled as needed and moved from site to site. To physically move electrical generation from site to site with the ease of moving an automobile is a new and unique way to provide electrical power in a novel and commercially viable way.

There are a number of significant and powerfully positive social imperatives that will be a direct result of our invention. The air quality in our states will improve. In a number of our corridor states the demon of air pollution will be realized as not the fault of the utility or most factories but the automobile and diesel truck. With our invention driving the automotive industry, cleaner vehicles will surely be a result and a cleaner air is sure to follow.

As a nation we are entering the information age, but the cost of electricity is so high in certain areas that many families already struggling with their budgets will not be able to surf the Internet. Our invention may bring the cost of electricity down to a more affordable plateau. Cheaper and more dependable energy to drive computers, to light homes so we can more fully enter the information age. This will drive the need for more computers, televisions, and other consumer electrical products.

Our invention will also provide a cheaper electricity to drive heat pumps. Clean and cheaper baseboard electric heating and cooling for homes and offices. Second homes and primary homes can be built in more remote locations, without the blight of massive developments suddenly appearing in our rural areas significantly changing the landscape and way of life.

A part of our current way of life is the two car family. Our invention brings now an interesting advantage to the two car family. The family that has two of our Power Park vehicles can use one to power their home and in essence rent the other vehicle to their neighbor, power their local grid or sell the power to their local utility.

Areas within our country that normally must face the winter with the fear of losing their electricity now will have Power Park as their electrical back up or primary source of electrical power. Winter can be faced without the fear of the cold invading the home. Other areas of our country that must face the ravages of storms such as hurricanes can count on Power Park in times of emergency.

We are not so arrogant as to say that our invention will make electricity "too cheap to meter." For electricity comes with a cost, but Power Park may bring electricity, and electrical reliability to remote locations and developing countries without the tremendous infrastructure costs normally associated with the electric utility industry. Electricity could come relatively soon to these countries with Power Park and jump them into the next century.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for generating electrical power from multiple vehicles powered by fuel cells while the vehicles are parked, comprising:
    a) a plurality of spaced-apart electrical receptacles each for receiving an electric cable for connection to a parked vehicle for electrically connecting the fuel cell in each of the parked vehicles to said plurality of electrical receptacles; a plurality of spaced-apart fuel connectors each for supplying fuel to a parked vehicle for operating the fuel cell in each of the parked vehicles;
    b) an electric power collection grid electrically connected to said plurality of electrical receptacles for collecting and transferring D.C. electrical power from the fuel cells in the parked vehicles to said electric power collection grid;
    c) at least one non-storing, electric power collection station electrically connected to said electric power collection grid for joining and transferring at a common point the D.C. electric power in said electric power collection grid;
    d) at least one inverter electrically connected to said at least one electric power collection station for converting the D.C. electric power to A.C. electric power; and
    e) means for supplying the A.C. electric power to a load and a utility grid for supplying electric power to other loads.

2. Apparatus in accordance with claim 1, further including a fuel supply grid connected to said plurality of fuel connectors for supplying fuel thereto.

3. Apparatus in accordance with claim 2, wherein each of said fuel connectors is a fuel hose and a receptacle for connecting said fuel hose to said fuel supply grid.

4. Apparatus in accordance with claim 1, wherein said plurality of electrical receptacles are electrically connected to form a plurality of series circuits, and said plurality of series circuits are connected in parallel to produce a predetermined electrical circuit.

5. Apparatus in accordance with claim 1, wherein said plurality of electrical receptacles are each connected to one of said electric cables for connection to a parked vehicle.

6. Apparatus in accordance with claim 1, wherein said electric power grid further includes a plurality of electrical relays and fault isolation means.

7. Apparatus in accordance with claim 1, wherein said means for supplying the A.C. electric power includes a plurality of electrical relays, means for voltage regulation, and meters for monitoring the A.C. electric power being supplied.

8. Apparatus in accordance with claim 1, wherein said apparatus is installed in a parking lot at street level.

9. Apparatus in accordance with claim 1, wherein said apparatus is installed in a multi-level parking lot above or below ground level or a combination thereof.

10. Apparatus in accordance with claim 1, wherein said apparatus is installed in an indoor or outdoor parking lot.

11. Apparatus in accordance with claim 1, further including a plurality of switching devices for connection to the fuel cell in each parked vehicle for switching the fuel cell from operating the vehicle to supplying power to said plurality of electrical receptacles.

12. A method for generating electrical power from at least one fuel cell powered vehicle that is parked, comprising:
    a) providing a fuel cell powered vehicle with switch means for switching between a locomotion mode and an electrical generation mode;
    b) connecting said vehicle to electrical receptacle means for connecting the parked vehicle to an electric system;
    c) engaging the vehicles operating system;
    d) switching the vehicle and its fuel cell to the electrical generation mode to produce D.C. electrical power and to transfer said D.C. electrical power from the fuel cell to said electric system; and
    e) converting the D.C. electrical power from the fuel cell to A.C. power by conversion equipment.

13. A method in accordance with claim 12, wherein the electric system is connected to a D.C. electric grid or load.

14. A method in accordance with claim 12, further including the step of supplying A.C. electric power to an A.C. electric grid or load.

15. A method in accordance with claim 12, further including the step of providing the vehicle with a fuel supply connector and means that bypasses the onboard tanks so as to allow the vehicle and its fuel cell to accept supplementary fuel to continuously generate electricity.

16. A method for generating electrical power from at least one internal combustion engine powered vehicle that is parked, comprising;
    a) providing an internal combustion engine powered vehicle with switch means for switching between a locomotion mode and an electrical generation mode;
    b) connecting said vehicle to electrical receptacle means for connecting the parked vehicle to an electric system;

c) engaging the vehicles operating system;

d) switching the vehicle to the electrical generation mode to produce D.C. electrical power and to transfer said D.C. electrical power from the vehicle to said electric system; and e) converting the D.C. electrical power from the vehicle to A.C. power by conversion equipment.

17. A method in accordance with claim 12, further including the step of collecting water in accordance with the following steps:

a) operating the fuel cell vehicle to produce electrical power while the vehicle is at rest;

b) collecting the water from the fuel cell vehicle utilizing a collection system; and c) storing said collected water in a transfer or holding tank.

18. A method in accordance with claim 17, further including the steps of:

a) operating a plurality of fuel cell vehicles;

b) collecting the waste water from a plurality of fuel cell vehicles; and c) storing said collected water.

19. A method in accordance with claim 12, further including the steps of:

a) collecting the carbon dioxide exhaust from the fuel cell vehicle; and b) storing the collected carbon dioxide exhaust from the fuel cell vehicle.

20. A method for generating electrical power from at least one turbine engine powered vehicle that is parked, comprising:

a) providing a turbine engine powered vehicle with switch means for switching between a locomotion mode and an electrical generation mode;

b) connecting said vehicle to electrical receptacle means for connecting the parked vehicle to an electric system;

c) engaging the vehicles operating system;

d) switching the vehicle to the electrical generation mode to produce D.C. electrical power and to transfer said D.C. electrical power from the vehicle to said electric system; and e) converting the D.C. electrical power from the vehicle to A.C. power by conversion equipment.

21. A method for generating electrical power from at least one hybrid powered vehicle that is parked, comprising:

a) providing a hybrid powered vehicle with switch means for switching between a locomotion mode and an electrical generation mode;

b) connecting said vehicle to electrical receptacle means for connecting the parked vehicle to an electric system;

c) engaging the vehicles operating system;

d) switching the vehicle to the electrical generation mode to produce D.C. electrical power and to transfer said D.C. electrical power from the vehicle to said electric system; and e) converting the D.C. electrical power from the vehicle to A.C. power by conversion equipment.

* * * * *